(12) United States Patent
Stadler et al.

(10) Patent No.: US 7,727,678 B2
(45) Date of Patent: *Jun. 1, 2010

(54) HOLOGRAPHIC DATA MEMORY

(75) Inventors: Stefan Stadler, Hamburg (DE); Steffen Noehte, Weinheim (DE); Christoph Dietrich, Heidelberg (DE); Jörn Leiber, Hamburg (DE); Matthias Gerspach, Dossenheim (DE)

(73) Assignee: Tesa Scribos GmbH, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/344,152

(22) PCT Filed: May 23, 2001

(86) PCT No.: PCT/EP01/05932

§ 371 (c)(1),
(2), (4) Date: Feb. 10, 2003

(87) PCT Pub. No.: WO02/15179

PCT Pub. Date: Feb. 21, 2002

(65) Prior Publication Data

US 2003/0165746 A1    Sep. 4, 2003

(30) Foreign Application Priority Data

Aug. 11, 2000  (DE) .............................. 100 39 372

(51) Int. Cl.
*G03H 1/02*   (2006.01)
(52) U.S. Cl. .................... 430/1; 430/2; 430/270.15; 430/945; 369/283; 359/3

(58) Field of Classification Search ............ 480/1, 480/2, 274, 5, 945; 369/275.2; 359/1, 3, 359/12

See application file for complete search history.

(56) References Cited

U.S. PATENT DOCUMENTS

| | | | |
|---|---|---|---|
| 3,288,389 A | | 11/1966 | Gersch et al. |
| 3,475,760 A | * | 10/1969 | Carlson ...................... 346/21 |
| 3,790,744 A | * | 2/1974 | Bowen ................... 219/121.69 |
| 3,823,276 A | | 7/1974 | Maslowski et al. ........ 179/100.3 |
| 3,976,354 A | | 8/1976 | Braitberg et al. |
| 4,069,049 A | | 1/1978 | Reich et al. |
| 4,085,501 A | * | 4/1978 | Currie .......................... 29/593 |
| 4,139,853 A | * | 2/1979 | Ghekiere et al. ............ 430/290 |

(Continued)

FOREIGN PATENT DOCUMENTS

DE           23 12 328         10/1974

(Continued)

OTHER PUBLICATIONS

Ramanujam et al., "Instant Holography", Appl. Phys. Lett., vol. 74(21) pp. 3227-3229.*

(Continued)

*Primary Examiner*—Martin J Angebranndt
(74) *Attorney, Agent, or Firm*—Nixon & Vanderhye, PC (57) ABSTRACT

A holographic data storage medium includes a polymer film which is set up as a storage layer and whose surface structure can be changed locally by heating. The polymer film is set up for the storage of holographic information via the local surface structure of the polymer film. A reflective layer can be provided on the data storage medium.

24 Claims, 2 Drawing Sheets

U.S. PATENT DOCUMENTS

| | | | |
|---|---|---|---|
| 4,252,400 A * | 2/1981 | Bernal et al. ................... 359/6 |
| 4,320,489 A * | 3/1982 | Crandall et al. ............. 369/111 |
| 4,368,878 A | 1/1983 | Meller |
| 4,370,391 A | 1/1983 | Mori et al. |
| 4,402,571 A * | 9/1983 | Cowan et al. .......... 204/192.26 |
| 4,450,553 A | 5/1984 | Holster et al. |
| 4,548,889 A | 10/1985 | Nemoto et al. .............. 430/273 |
| 4,581,317 A | 4/1986 | Simmons, III .............. 430/270 |
| 4,599,718 A * | 7/1986 | Nakagawa et al. .......... 369/100 |
| 4,636,804 A * | 1/1987 | Kuder ....................... 347/264 |
| 4,638,335 A | 1/1987 | Smith et al. |
| 4,651,172 A | 3/1987 | Watanabe et al. ........ 346/135.1 |
| 4,666,819 A | 5/1987 | Elmasry |
| 4,773,060 A | 9/1988 | Shimada et al. ............. 369/100 |
| 4,800,112 A * | 1/1989 | Kano et al. ................. 428/163 |
| 4,837,745 A | 6/1989 | Eich et al. ................... 365/108 |
| 4,856,857 A * | 8/1989 | Takeuchi et al. ................ 359/3 |
| 4,860,273 A | 8/1989 | Sawano et al. .............. 369/100 |
| 4,883,741 A | 11/1989 | Takahashi et al. ........... 430/270 |
| 4,893,887 A * | 1/1990 | Coates .......................... 359/1 |
| 4,918,682 A * | 4/1990 | Finegan .................. 369/275.2 |
| 4,933,221 A | 6/1990 | Nishimura et al. |
| 4,939,035 A | 7/1990 | Swofford |
| 4,970,707 A | 11/1990 | Hara et al. ............... 369/44.11 |
| 5,014,259 A * | 5/1991 | Goldberg et al. ............. 369/284 |
| 5,019,476 A | 5/1991 | Kanno et al. .................. 430/20 |
| 5,023,859 A | 6/1991 | Eich et al. ................... 365/113 |
| 5,034,943 A | 7/1991 | Antonov et al. ............. 369/260 |
| 5,049,462 A | 9/1991 | Funhoff et al. ................. 430/21 |
| 5,063,555 A | 11/1991 | Miyoshi et al. ............... 369/97 |
| 5,070,488 A | 12/1991 | Fukushima et al. |
| 5,077,724 A | 12/1991 | Gregg |
| 5,090,008 A * | 2/1992 | Clark et al. .................. 369/284 |
| 5,090,009 A | 2/1992 | Hamada et al. |
| 5,098,803 A | 3/1992 | Monroe et al. |
| 5,098,975 A | 3/1992 | Omelis et al. |
| 5,109,374 A | 4/1992 | Tsunoda et al. ............. 369/100 |
| 5,124,183 A | 6/1992 | Nakano et al. .................. 428/1 |
| 5,138,604 A | 8/1992 | Umeda et al. |
| 5,175,045 A | 12/1992 | Henry et al. |
| 5,188,863 A * | 2/1993 | de Graaf et al. .............. 427/512 |
| 5,205,178 A | 4/1993 | Odernheimer ........... 73/863.12 |
| 5,215,800 A * | 6/1993 | Daido et al. ................ 428/64.8 |
| 5,234,799 A | 8/1993 | Nagae et al. ................. 430/345 |
| 5,272,689 A | 12/1993 | Tsujioka et al. ............. 369/112 |
| 5,289,407 A | 2/1994 | Strickler et al. ............. 365/106 |
| 5,297,132 A | 3/1994 | Takano et al. ............... 369/284 |
| 5,300,169 A | 4/1994 | Tahara |
| 5,311,499 A | 5/1994 | Hwang .................... 369/275.2 |
| 5,312,713 A | 5/1994 | Yokoyama et al. ........... 430/200 |
| 5,368,789 A | 11/1994 | Kamitakahara et al. .... 264/1.33 |
| 5,369,631 A | 11/1994 | Hwang ....................... 369/113 |
| 5,382,463 A | 1/1995 | Adkins et al. ................ 428/141 |
| 5,384,221 A * | 1/1995 | Savant et al. .................. 430/19 |
| 5,447,767 A | 9/1995 | Tanabe et al. ............... 428/64.4 |
| 5,459,019 A | 10/1995 | Kato et al. ................... 430/271 |
| 5,492,370 A * | 2/1996 | Chatwin et al. ............. 283/110 |
| 5,508,143 A | 4/1996 | Taniguchi et al. ....... 430/270.21 |
| 5,509,991 A * | 4/1996 | Choi .......................... 156/245 |
| 5,510,171 A | 4/1996 | Faykish |
| 5,519,517 A | 5/1996 | Redfield et al. ................ 359/22 |
| 5,572,492 A | 11/1996 | Ogawa ......................... 369/14 |
| 5,587,993 A | 12/1996 | Gregg ......................... 369/291 |
| 5,627,817 A | 5/1997 | Rosen et al. ................... 369/58 |
| 5,639,588 A * | 6/1997 | Huh ....................... 430/270.15 |
| 5,658,411 A | 8/1997 | Faykish |
| 5,669,995 A | 9/1997 | Hong ........................... 156/74 |
| 5,702,805 A | 12/1997 | Yin et al. |
| 5,744,219 A * | 4/1998 | Tahara ...................... 428/32.79 |
| 5,757,521 A * | 5/1998 | Walters et al. ................... 359/2 |
| 5,764,583 A | 6/1998 | Cliff et al. ............. 365/230.03 |
| 5,797,492 A | 8/1998 | Seki et al. |
| 5,800,950 A | 9/1998 | Hirao et al. ..................... 430/1 |
| 5,822,092 A * | 10/1998 | Davis ........................... 359/10 |
| 5,838,653 A | 11/1998 | Fan et al. .................. 369/275.1 |
| 5,843,626 A | 12/1998 | Ohta et al. |
| 5,851,615 A | 12/1998 | Kay |
| 5,855,979 A | 1/1999 | Umehara et al. ........... 428/64.1 |
| 5,866,236 A | 2/1999 | Faykish et al. |
| 5,871,881 A | 2/1999 | Nishida et al. ......... 430/270.11 |
| 5,879,774 A | 3/1999 | Taylor et al. ............... 428/64.1 |
| 5,890,674 A | 4/1999 | Major |
| 5,922,455 A * | 7/1999 | Stepanek .................... 428/332 |
| 5,958,650 A | 9/1999 | Wolleb et al. |
| 5,998,007 A | 12/1999 | Prutkin et al. ............ 428/320.2 |
| 6,016,210 A * | 1/2000 | Stappaerts ................... 359/10 |
| 6,016,984 A | 1/2000 | Trafton et al. ............. 242/348.1 |
| 6,154,432 A | 11/2000 | Faruqi et al. |
| 6,168,682 B1 | 1/2001 | Bennett et al. .............. 156/295 |
| 6,226,415 B1 | 5/2001 | Wilson et al. |
| 6,236,589 B1 | 5/2001 | Gupta et al. ................. 365/151 |
| 6,266,166 B1 | 7/2001 | Katsumata et al. |
| 6,310,850 B1 | 10/2001 | Sochava et al. |
| 6,338,935 B1 | 1/2002 | Alperovich et al. .... 430/270.11 |
| 6,364,233 B1 | 4/2002 | Crowley .................. 242/332.8 |
| 6,372,341 B1 | 4/2002 | Jung et al. |
| 6,383,690 B1 | 5/2002 | Vargas .......................... 430/5 |
| 6,386,458 B1 | 5/2002 | Leiber et al. |
| 6,388,780 B1 * | 5/2002 | Monaghan et al. ............ 359/35 |
| 6,436,483 B2 | 8/2002 | Palmasi et al. |
| 6,450,642 B1 | 9/2002 | Jethmalani et al. .......... 351/219 |
| 6,452,890 B2 * | 9/2002 | Kawano et al. ........ 369/110.01 |
| 6,614,741 B1 | 9/2003 | Hesselink et al. |
| 6,614,742 B2 | 9/2003 | Ueyanagi |
| 6,714,437 B1 | 3/2004 | Leiber et al. |
| 6,723,259 B1 | 4/2004 | Groth et al. |
| 6,789,262 B1 | 9/2004 | Leiber et al. ................ 720/746 |
| 6,805,934 B2 | 10/2004 | Ohtaki et al. |
| 6,830,850 B1 | 12/2004 | Krivokapic et al. |
| 6,881,476 B2 | 4/2005 | Noehte et al. |
| 6,958,836 B2 | 10/2005 | Leiber et al. |
| 7,151,623 B2 * | 12/2006 | Leiber et al. .................... 359/3 |
| 7,158,273 B2 * | 1/2007 | Stadler et al. ................... 359/3 |
| 2002/0005888 A1 | 1/2002 | Obata et al. |
| 2003/0031112 A1 | 2/2003 | Horimai |
| 2003/0063342 A1 | 4/2003 | Horimai |
| 2003/0096105 A1 * | 5/2003 | Noehte et al. ............... 428/332 |
| 2003/0124436 A1 | 7/2003 | Shioda et al. |
| 2003/0142619 A1 | 7/2003 | Mussig et al. |
| 2003/0156524 A1 | 8/2003 | Stadler et al. |
| 2003/0161018 A1 | 8/2003 | Stadler et al. |
| 2003/0165105 A1 | 9/2003 | Leiber et al. |
| 2003/0165746 A1 | 9/2003 | Stadler et al. |
| 2003/0169674 A1 | 9/2003 | Leiber et al. |
| 2003/0179277 A1 | 9/2003 | Stadler et al. |
| 2003/0235136 A1 | 12/2003 | Akselrod et al. |
| 2004/0001400 A1 | 1/2004 | Amble et al. |
| 2004/0009406 A1 | 1/2004 | Hesselink et al. |
| 2004/0030732 A1 | 2/2004 | Gerspach et al. |
| 2004/0036187 A1 | 2/2004 | Leiber et al. |
| 2004/0051919 A1 | 3/2004 | Noehte et al. |
| 2004/0053140 A1 * | 3/2004 | Stadler et al. ................... 430/1 |
| 2004/0066546 A1 | 4/2004 | Noehte et al. |
| 2004/0136037 A1 | 7/2004 | Leiber et al. |
| 2004/0136040 A1 | 7/2004 | Noehte et al. |
| 2004/0145788 A1 * | 7/2004 | Leiber et al. .................... 359/3 |

FOREIGN PATENT DOCUMENTS

| | | |
|---|---|---|
| DE | 2910390 | 10/1979 |
| DE | 3110583 | 1/1982 |
| DE | 37 23 522 | 2/1989 |
| DE | 3810722 A1 | 10/1989 |
| DE | 3920420 A1 | 1/1991 |

| | | | | | | |
|---|---|---|---|---|---|---|
| DE | 195 37 829 | 10/1996 | | JP | 1-256042 | 10/1989 |
| DE | 68926896 | 12/1996 | | JP | 2-98822 | 4/1990 |
| DE | 69222527 | 4/1998 | | JP | 2-105346 | 4/1990 |
| DE | 198 08 288 | 9/1999 | | JP | 2-118632 | 5/1990 |
| DE | 29816802 | 3/2000 | | JP | 3-23517 | 1/1991 |
| DE | 19935776 | 2/2001 | | JP | 3-134852 | 6/1991 |
| DE | 19947782 | 4/2001 | | JP | 3-147540 | 6/1991 |
| DE | 10039370 | 2/2002 | | JP | 3-164293 | 7/1991 |
| DE | 10039374 | 2/2002 | | JP | 4-197781 | 7/1992 |
| DE | 10039372 | 3/2002 | | JP | 04299180 | 10/1992 |
| DE | 101 28 902 A1 | 10/2003 | | JP | 5-046061 | 2/1993 |
| EP | 0 323 167 | 7/1989 | | JP | 5-109234 | 4/1993 |
| EP | 0 352 194 | 1/1990 | | JP | 5109121 | 4/1993 |
| EP | 0 360 144 | 3/1990 | | JP | 5-334749 | 12/1993 |
| EP | 0 384 041 | 8/1990 | | JP | 6-20292 | 1/1994 |
| EP | 0 938 255 | 11/1990 | | JP | 6-60461 | 3/1994 |
| EP | 0 403 971 | 12/1990 | | JP | 8-273325 | 10/1996 |
| EP | 0 410 205 | 1/1991 | | JP | 9-171235 | 6/1997 |
| EP | 0 421 761 | 4/1991 | | WO | 00/09884 | 2/2000 |
| EP | 0 458 604 | 11/1991 | | WO | WO 00/17864 | 3/2000 |
| EP | 0 475 336 | 3/1992 | | WO | 00/54112 | 9/2000 |
| EP | 0 514 589 | 11/1992 | | WO | 01/04880 A1 | 1/2001 |
| EP | 0 519 633 | 12/1992 | | WO | 01/84544 A1 | 11/2001 |
| EP | 0 528 134 | 2/1993 | | WO | 02/15179 A | 2/2002 |
| EP | 0 552 887 | 7/1993 | | WO | 02/46845 A1 | 6/2002 |
| EP | 0 585 076 | 3/1994 | | | | |
| EP | 0 613 126 | 8/1994 | | | | |
| EP | 0 615 233 A1 | 9/1994 | | | | |
| EP | 0 660 262 A2 | 6/1995 | | | | |
| EP | 0 750 308 | 12/1996 | | | | |
| EP | 0 768 353 | 4/1997 | | | | |
| FR | 2 703 815 A | 10/1994 | | | | |
| GB | 2 211 760 A | 7/1989 | | | | |
| JP | 55-080832 | 6/1980 | | | | |
| JP | 58-155543 | 9/1983 | | | | |
| JP | 60-52941 | 3/1985 | | | | |
| JP | 61-99981 | 5/1986 | | | | |
| JP | 61-145746 | 7/1986 | | | | |
| JP | 61-238079 * | 10/1986 | | | | |
| JP | 62-231437 | 10/1987 | | | | |
| JP | 63-039381 | 2/1988 | | | | |
| JP | 63-304429 | 12/1988 | | | | |
| JP | 1-190494 | 7/1989 | | | | |

OTHER PUBLICATIONS

Langnois et al. "Diffractive optical elements fabricated by direct laser writing and other techniques", Proc. SPIE 1751 pp. 2-12 (1992).*

Gale et al. "Fabrication of continuous relief microoptical elements by direct laser writing in photoresists", Opt. Eng. vol. 33(11) pp. 3556-3566 (Nov. 1994).*

Von Joachim Pich, "Klebe für mehr Gigabyte", CHIP Online, Inhaltsverzeichnis CHIP Sep. 1998.

CHIP Das Computer Magazine, Industrie Baut Auf Plastik, Tesa-Film als Giga-Speicher, pp. 194-198 (1998).

Optimem Das Projekt OptiMem verfolgt im Wesentlichen drei Ziele: pp. 1-8.

US 2004/0150802 with pending claims as of Jul. 3, 2006.

US 2003/0156524 with pending claims as of Jul. 3, 2006.

* cited by examiner

HOLOGRAPHIC DATA MEMORY

This application is the national stage of PCT/EP01/05932, which designated the United States.

BACKGROUND AND SUMMARY

The present technology relates to a holographic data storage medium which can be used, for example, for storing image data such as photos, logos, text, and so on but also for the storage of other data.

In a hologram, optical phase information about an object is contained distributed over the surface of the hologram, from which an image of the object can be reconstructed when it is irradiated with light, in particular coherent light from a laser. Holograms are used in industry in many ways, for example in the form of largely counterfeit-proof identifications. Identifications of this type will be found, for example, on credit cards or cheque cards; as what are known as white light holograms, they show a three-dimensional image of the object represented even when lit with natural light. Photographically produced holograms and embossed holograms are widespread, in which a relief structure is embossed into the surface of a material, at which the light used to reproduce the object is scattered in accordance with the information stored in the hologram, so that the reconstructed image of the object is produced by interference effects.

WO 00/17864 describes a data storage medium having an optical information carrier which contains a polymer film set up as a storage layer. The polymer film consists, for example, of biaxially oriented polypropylene. In the previously disclosed data storage medium, the polymer film is wound spirally in a plurality of layers onto a core, there being an adhesive layer in each case between adjacent layers. Information can be written into the data storage medium by the polymer film being heated locally with the aid of a write beam, focused on a predetermined position, from a data drive, as a result of which the refractive index of the polymer film and the reflection capacity at the interface of the polymer film change locally. This can be registered with the aid of a read beam in the data drive, since the read beam is reflected locally more or less intensely at the interface of the polymer film, depending on the information written in.

The present technology provides a holographic data storage medium which is cost-effective and has wide possible applications.

The holographic data storage medium according to an exemplary embodiment of the invention has a polymer film which is set up as a storage layer and whose surface structure can be changed locally by heating. The polymer film is set up for the storage of holographic information via the local surface structure of the polymer film.

The surface structure or topography of the polymer film may be changed locally by, for example, a laser beam serving as a write beam being focused onto the polymer film, preferably its surface zone, so that the light energy is absorbed there and converted into heat energy. In particular if the laser beam is radiated in briefly (pulsed), the material change in the polymer film leading to the local change in the surface structure is limited to a very small volume owing to the generally poor thermal conductivity of the polymer.

When information is put into the holographic data storage medium, the structure change of the surface is preferably induced point by point, as explained in more detail further below. The local region for the storage of a unit of information (referred to in the following text as a "pit") typically has linear lateral dimensions (that is to say for example a side length or a diameter) of the order of magnitude of 0.5 µm to 1 µm, although other sizes are possible. The height profile of the polymer film, in the event of a change in the surface structure in a pit, typically changes by 50 nm to 500 nm, which depends in detail on the characteristics and operating conditions of the write beam and the characteristics of the data storage medium. The point grid, that is to say the centre spacing between two pits, typically lies in the range from 1 µm to 2 µm. It is generally true that shorter optical wavelengths of the write beam permit a closer point grid.

In order to read information out of the holographic data storage medium according to an exemplary embodiment of the invention, the storage layer can be irradiated with coherent light, so that the surface structure of the polymer film acts like a diffraction grating and a holographic image is produced by interference effects, as explained in more detail further below.

The holographic data storage medium according to the present technology is cost-effective and may be applied in many ways.

The polymer film can be oriented and is preferably biaxially oriented, for example by being prestressed in two directions at right angles to each other within its plane during production. In the case of an oriented polymer film, a high energy density is stored in the film material. As a result of local heating with the deposition of a relatively small quantity of energy per unit area, for example with the aid of a write beam, a relatively intense material change with a change in the local surface structure of the polymer film can be achieved. Biaxially oriented polymer films may be produced from cost-effective mass-produced plastics.

Suitable materials for the polymer film are, for example, polypropylene or polyvinyl chloride, polymer films which have such a material preferably being biaxially oriented. A higher temperature stability and therefore also an improved resistance to ageing and storage stability of the holographic data storage medium, and increased security against loss of data arising from ageing processes may be achieved with polymer films which have an elevated crystallite melting point. Examples of such materials are polyethylene terephthalate (PET), polymethyl pentene (PMP); also poly-2-methyl pentene) and polyimide, a polymer film of such materials also preferably being biaxially oriented. In the case of higher intensities of a write beam, other types of film can also be used.

Preferred thicknesses of the polymer film lie in the range from 10 µm to 200 µm, but smaller or larger thicknesses are also conceivable.

To the polymer film, there can be assigned an absorber dye, which is set up to at least partly absorb a write beam serving to input information and to give up the heat produced in the process at least partly locally to the polymer film. An absorber dye of this type permits local heating of the polymer film which is sufficient to change the surface structure at a relatively low intensity of the write beam. The absorber dye is preferably arranged in the material of the polymer film. However, it can also be arranged in a separate absorber layer, which preferably has a binder; mixed forms are likewise conceivable. For example, the absorber layer can have a thin layer (for example a thickness of 1 µm to 5 µm) of an optically transparent polymer (for example of polymethyl methacrylate PMMA) or, in the case of applications for higher temperature, of polymethyl pentene, polyether etherketone (PEEK) or polyetherimide) which serves as a matrix or binder for the molecules of the absorber dye. The absorption maximum of the absorber dye should coincide with the optical wavelength of the write beam used, in order to achieve efficient absorption. For an optical wavelength of 532 nm of a write beam produced by a laser, for example dyes from the Sudan red family (diazo dyes) or (for particularly polar plastics) eosin scarlet are suitable. For the common laser diodes with an optical wavelength of 665 nm or 680 nm, green dyes, for example from the styryl family (which are commonly used as laser dyes), are more suitable.

A reflective layer can be arranged on that surface of the polymer film which is changed during the storage of holographic information. If this reflective layer is applied after information has been put in, or is not changed or not significantly changed when information is put in, it increases the efficiency of the holographic data storage medium. This is because coherent light used when information is being read out is to a large extent reflected at the surface by the reflective layer and, in the process, modulated by the surface structure, so that a reflectively bright holographic image is produced.

However, the reflective layer can also be configured in such a way that the reflection capacity (reflectivity) of the reflective layer can be changed locally by heating. This may be achieved, for example, with a very thin reflective layer which, under the action of heat from a write beam, is locally partly or completely evaporated. A reflective layer of this type permits a holographic data storage medium in which both the surface structure of the polymer film (and also of the adjacent reflective layer) and the reflection capacity or the optical transmissivity of the reflective layer are changed when information is put in. When information is read out, in addition to phase modulation (because of the varying surface structure), amplitude modulation (because of the varying optical transmissivity) is consequently also obtained. A holographic data storage medium of this type offers numerous possible applications.

In an alternative refinement of the holographic data storage medium, a reflective layer is arranged on that surface of the polymer film which is opposite the surface that is varied during the storage of holographic information. This reflective layer is preferably already present before information is put in and is not changed when information is put in. It is preferably flat and effects reflection of light, which is used to read out information after it has passed through the varying surface structure of the polymer film and the polymer film itself. One advantage of such a reflective layer is the possibility of being able to apply the holographic data storage medium to a non-transparent carrier or virtually any desired substrate. The thickness of the polymer film serving as a storage layer is preferably selected such that no disturbed interference or superposition effects occur.

In a preferred refinement of the present technology, the holographic data storage medium has an adhesive layer for sticking the data storage medium to an object. The adhesive layer makes it possible to stick the data storage medium quickly and without difficulty to a desired object, for example to use the data storage medium as a machine-readable label in which information about the object is stored. Particularly suitable as an adhesive layer is a self-adhesive layer or a layer with a pressure-sensitive adhesive, which, in the delivered state of the data storage medium, is preferably provided with a protective covering that can be pulled off (for example of a film or a silicone paper).

Apart from the layers previously mentioned, the data storage medium according to the present technology can also have additional layers, for example a transparent protective layer or a flexible or dimensionally stable carrier.

The information to be stored can be input into the holographic data storage medium according to the present technology by a method in which holographic information contained in a hologram of a storing object is calculated as a two-dimensional arrangement, and a write beam of a writing device, preferably a laser lithograph, is aimed at a storage layer and/or if appropriate the associated absorber layer of the data storage medium and is driven in accordance with the two-dimensional arrangement in such a way that the local surface structure of the polymer film set up as a storage layer is set in accordance with the holographic information. Since the physical processes in the scattering of light at a storing object are known, for example a conventional set-up for producing a hologram (in which coherent light from a laser, which is scattered by an object (storing object) is brought into interference with a coherent reference beam and the interference pattern produced in the process is recorded as a hologram) is simulated with the aid of a computer program, and the interference pattern or the modulation for the surface structure of the polymer film is calculated as a two-dimensional arrangement (two-dimensional array). The resolution of a suitable laser lithograph is typically about 50 000 dpi (dots per inch). The surface structure of the polymer film can therefore be changed locally in regions or pits with a size of about 0.5 μm to 1 μm. The writing speed and other details depend, inter alia, on the parameters of the write laser (laser power, optical wavelength) and the time of exposure and on the characteristics of the storage layer and any absorber dye.

The holographic information is therefore preferably put in in the form of pits of predefined size; the term "pit" is to be understood here in general terms in the sense of a changed region and not exclusively in its original meaning as a hole or depression. In this case, the holographic information can be stored in a pit in binary encoded form. This means that, in the region of a given pit, the surface structure of the storage layer assumes only one of two possible basic shapes. These basic shapes preferably differ considerably in order that intermediate forms which occur in practice and which are close to one or the other basic shape can be assigned unambiguously to one or the other basic shape, in order to store the information reliably and unambiguously.

Alternatively, the holographic information can be stored in a pit in continuously encoded form, the local maximum height change in the surface structure in the pit being selected from a predefined value range. This means that, in a given pit, the surface structure of the storage layer can assume intermediate shapes between two basic shapes, so that the maximum height change in the present intermediate shape assumes a value from a predefined value range whose limits are given by the maximum height changes of the two basic shapes. In this case, the information can therefore be stored "in grey stages", so that each pit is given the information content from more than one bit.

If a reflective layer is arranged on the surface of the polymer film that is changed during the storage of holographic information, this reflective layer is preferably applied after the local surface structure of the polymer film has been set in accordance with the holographic information. However, the reflective layer can also be applied before the local surface structure of the polymer film is set in accordance with the holographic information. In the latter case, a reflective layer whose reflection capacity can be changed locally by heating permits a holographic data storage medium in which both the local surface structure of the polymer film and the local reflection capacity of the reflective layer can be set in accordance with the holographic information via local heating by means of the write beam. The advantages of these variants are explained further above.

In a method of reading information out of a holographic data storage medium according to the present technology, light, preferably coherent light (for example from a laser), is aimed at a large area of a storage layer of the data storage medium and modulated by the surface structure of the polymer film. As a reconstruction of the holographic information contained in the region covered by the light, a holographic image is registered at a distance from the data storage medium, for example by a CCD sensor which is connected to a data processing device.

The term "large area" is to be understood to mean an area which is considerably larger than the area of a pit. In this sense, for example, an area of 1 mm.sup.2 is a large area. For the scheme according to which information is stored in a holographic data storage medium according to the present technology and read out, there are many different possibilities. It is conceivable to read out from the data storage medium in one operation, by the entire area of the polymer film set up as a storage layer being illuminated in one operation. In particular in the case of larger areas, however, it is advantageous to divide up the information to be stored into a number or large number of individual regions (for example with a respective area of 1 mm.sup.2) and to read out the information only from a predefined individual area in one operation.

The fact that during the reading of information, depending on the configuration of the holographic data storage medium, the light shines through the polymer film or else does not shine through the polymer film (if it is reflected directly at the surface structure or at a reflective layer located there) and may possibly be modulated not only by the surface structure of the polymer film but also by the locally varying reflection capacity of the reflective layer, has already been explained further above.

During the reading of information, as a result of the locally varying surface structure of the polymer film, that is to say its regionally different topography, differences occur in the propagation times of the light waves which originate from various points, that is to say ultimately periodic phase modulation. This applies both to arrangements in which the polymer film is transilluminated (with or without reflection) and for arrangements in which it is not transilluminated (direct reflection at the surface structure). Added to this, in the case of a locally varying reflection capacity, is an amplitude modulation. The region of the polymer film covered by the coherent light acts like a diffraction grating which deflects incident light in a defined manner. The deflected light forms an image of the stored object, which represents the reconstruction of information encoded in the holographic data storage medium.

The holographic data storage medium according to the present technology can be used for different types of storing objects. For example, both the information contained in images, such as photographs, logos, text, and so on, and machine-readable data can be stored and read out. The latter is carried out, for example, in the form of data pages, as they are known, the holographic information contained in a hologram of a graphic bit pattern (which represents the data information) being input into the storage layer as explained. When the said data is read out, a holographic image of this graphic bit pattern is produced. The information contained therein can be registered, for example with the aid of an accurately adjusted CCD sensor, and processed by associated evaluation software. For the reproduction of images, in which high accuracy is not an issue, in principle even a simple matt disc, or, for example, a camera with an LCD screen is sufficient.

In the case of the holographic storage of machine-readable data, it is advantageous that the information does not have to be read out sequentially but that an entire data set can be registered in one operation, as explained. Should the surface of the storage layer be damaged, then, as opposed to a conventional data storage medium, this does not lead to a loss of data but only to a worsening of the resolution of the holographic image reconstructed when the information is read out, which is generally not a problem.

BRIEF DESCRIPTION OF THE DRAWINGS

In the following text, the present technology will be explained further using exemplary embodiments. In the drawings.

DESCRIPTION OF EXAMPLE EMBODIMENTS

Figure 1:
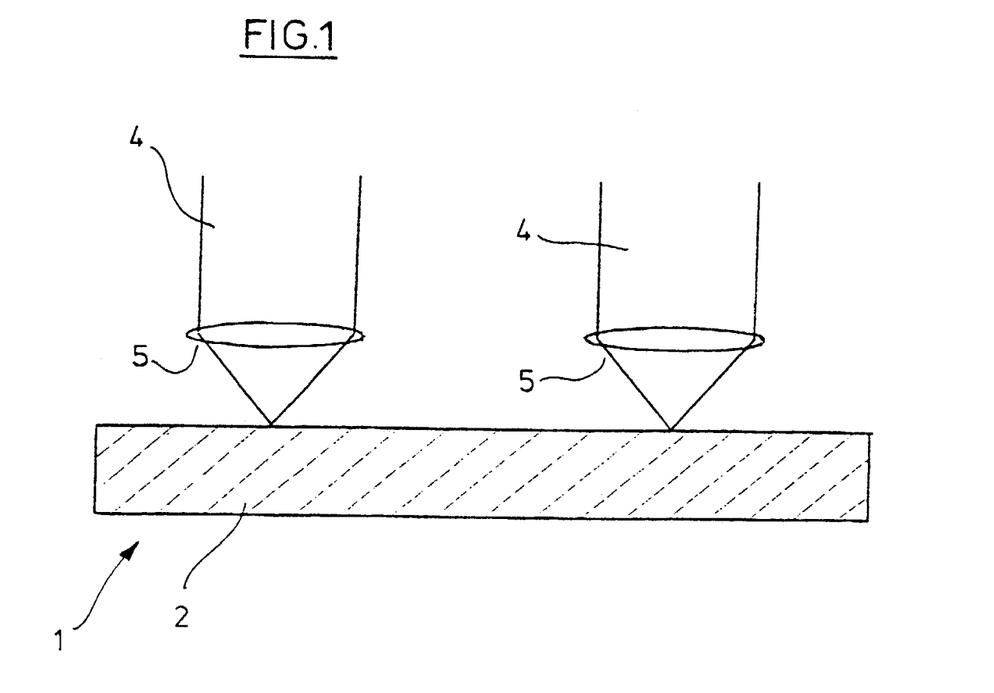
FIG. 1 shows a schematic view of an embodiment of the holographic data storage medium according to the invention, information being put in with the aid of a write beam.

An embodiment of a holographic data storage medium 1 is illustrated in a schematic longitudinal sectional view in FIG. 1. The data storage medium 1 has a polymer film 2 which is set up as a storage layer and, in the exemplary embodiment, consists of biaxially oriented polypropylene (BOPP) and has a thickness of 50 μm.

Contained in the material of the polymer film 2 is an absorber dye, which absorbs light from a write beam and converts it into heat. In the exemplary embodiment, Sudan red 7B is used as the absorber dye, which absorbs light in the wavelength range around 532 nm particularly well; this wavelength is conceivable for a write beam of a laser lithograph for putting information into the data storage medium 1. Examples of other absorber dyes are indicated further above. For example, green dyes, for example from the Styryl family, are suitable, particularly for optical wavelengths of 665 nm or 680 nm, at which the laser diodes of current DVD appliances operate; the pulses from such laser diodes can be modulated directly, which simplifies and cheapens the generation of pulses considerably.

The polymer film 2 with the absorber dye has a preferred optical density in the range from 0.2 to 1.0; other values are likewise possible, however. The optical density is a measure of the absorption, based here on the optical wavelength of a write beam. The optical density is defined as the negative decimal logarithm of the transmission through the absorber layer, which coincides with the product of the extinction coefficient at the wavelength of the write beam used, the concentration of the absorber dye in the polymer film 2 and the thickness of the polymer film 2.

The absorber dye makes it easier to put information into the data storage medium 1. This is because if, for example with the aid of a lens 5, a write beam 4 is focused onto the polymer film 2, to be specific preferably in its surface zone, the optical energy of the write beam 4 is converted particularly efficiently into heat. FIG. 1 shows two write beams 4 and two lenses 5, in order to illustrate the action of writing information at two different points of the polymer film 2. In practice, however, the write beam 4 preferably moves sequentially over the surface of the polymer film 2. Suitable for the input of information is, for example, a laser lithograph with a resolution of 50 000 dpi (that is to say about 0.5 μm). The write beam from the laser lithograph is led in pulsed operation (typical pulse duration of about 1 μs to about 10 μs at a radiated power of about 1 mW to about 10 mW to expose or heat a point) over the upper side of the polymer film 2, that is to say as a rule in two spatial directions, in order to input the desired information sequentially into the data storage medium 1 (or a preselected region of the data storage medium 1).

Figure 2:
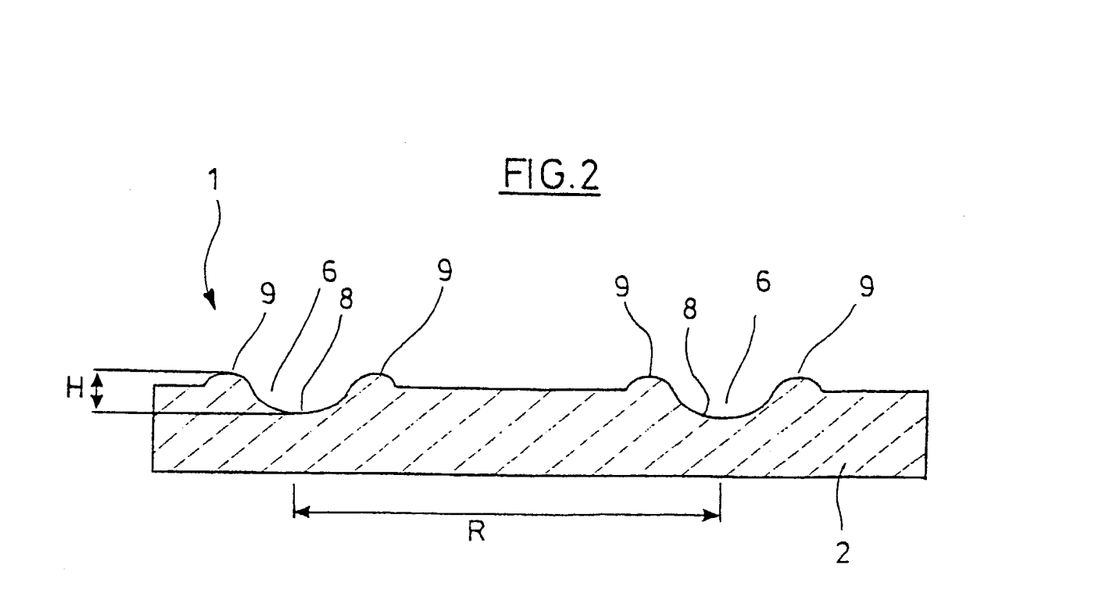
FIG. 2 shows a schematic view of the holographic data storage medium from FIG. 1, after the surface structure has been changed locally in order to input the information.

FIG. 2 shows the result of the action of the pulsed write beam 4. Because of the poor thermal conductivity of the material of the polymer film 2, there is a significant increase in temperature in a closely limited volume, at which temperature increase the surface structure of the polymer film 2 changes locally. In this way, a pit 6 is produced, that is to say the local region in which information is stored. A central depression 8, which is surrounded by a peripheral bank 9 of ejected material belongs to each pit 6. The difference in level between the lowest point of the depression 8 and the highest point of the bank 9, that is to say the local maximum height change in the surface structure in the pit 6, is designated by H in FIG. 2. H lies typically in the range from 50 nm to 500 nm. The distance between the centres of two adjacent pits 6, that is to say the point grid R, is preferably in the range from 1 μm to 2 μm. In the exemplary embodiment, a pit 6 has a diameter of about 0.8 μm. Shapes other than circular pits 6 are likewise possible. The typical dimension of a pit is preferably about 0.5 μm to 1.0 μm.

In a pit 4, the information can be stored in binary encoded form, by H assuming only two different values (one of the two values preferably being 0). It is also possible to store the information in a pit 4 in continuously encoded form, it being possible for H for a given pit 4 to assume any desired selected value from a predefined value range. Expressed clearly, in the case of storage in binary encoded form, a pit is "black" or "white", while in the case of storage in continuously encoded form, it can assume all the grey values lying in between.

In order to put information into the data storage medium 1, first of all holographic information contained in a hologram of a stored object is calculated as a two-dimensional arrangement. This can be carried out, for example, as a simulation of a classical structure for producing a photographically recorded hologram, in which coherent light from a laser, which is scattered by the stored object, is brought into interference with a coherent reference beam and the modulation pattern produced in the process is recorded as a hologram. The two-dimensional arrangement (two-dimensional array) then contains the information which is required to drive the write beam of a laser lithograph already explained further above. If the write beam of the laser lithograph is guided in pulsed operation over the surface of the data storage medium 1, it heats the polymer film 2 in accordance with the two-dimensional array. In the process, the pits 6 are produced, as seen above.

Figure 3:
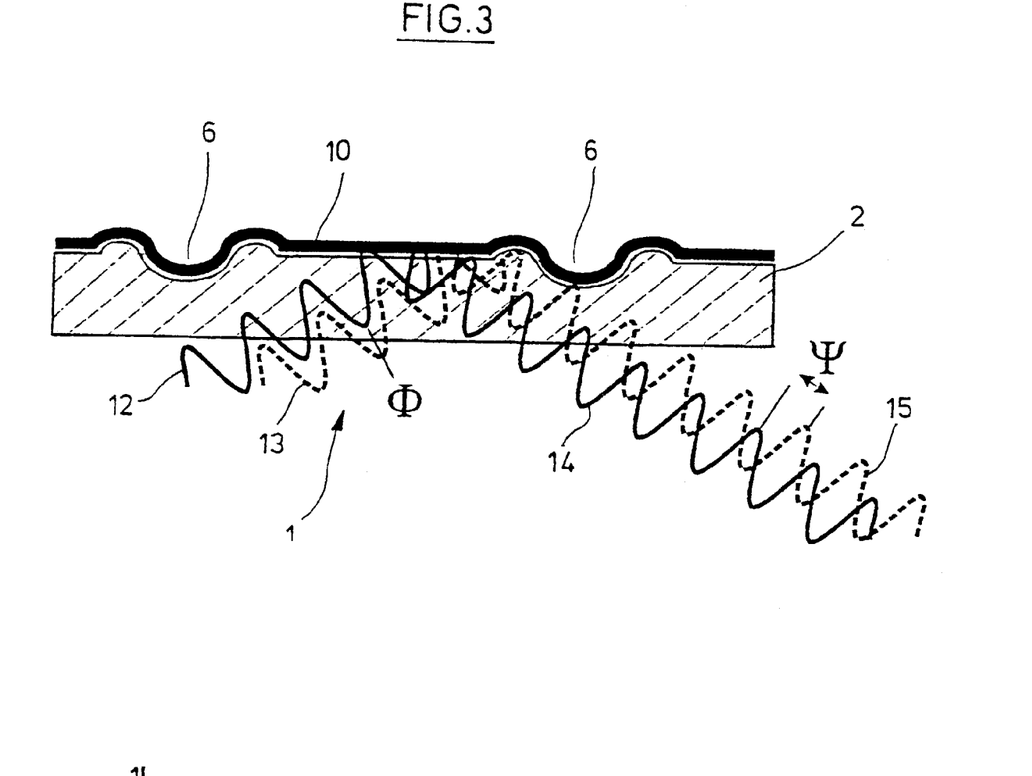
FIG. 3 shows a schematic view of the holographic data storage medium according to FIG. 2, after the changed surface structure has been provided with a reflective layer, during the reading of information

In order to make it easier to read information out of the data storage medium 1, the surface of the polymer film 2 having the changed surface structure, that is to say after the information has been put in, is vapour-deposited with aluminium in the exemplary embodiment, so that a reflective layer 10 with a thickness of 50 nm, for example, is produced, see FIG. 3.

FIG. 3 illustrates in a schematic way how the information stored in the data storage medium 1 can be read out. For this purpose, coherent light from a laser (preferably at a wavelength which is not absorbed or absorbed only slightly by the absorber dye in the polymer film 2) is aimed at the substantially flat underside of the data storage medium 1. For reasons of clarity, only a small detail of this preferably parallel incident coherent light (incident read beam) is illustrated in FIG. 3, namely the incident light waves designated 12 and 13. In practice, the coherent light is aimed at the polymer film 2 over a large area and covers a region of, for example, 1 mm². This is because the light originating from many pits 6 must be registered in order to reconstruct the stored information. The intensity of the incident read beam is to weak to change the surface structure of the polymer film 2 and therefore the stored information.

The light waves 12 and 13 have a fixed phase Φ in relation to one another. For practical reasons, they are incident at an angle on the rear side of the reflective layer 10, after they have penetrated the polymer film 2, and are reflected at the reflective layer 10, so that reflected light waves 14 and 15 originate from the reflective layer 10 and again pass through the polymer film 2. Since the local surface structure of the polymer film 2 and, accordingly, of the reflective layer 10 is varied across the pits 6, a phase shift occurs, and the reflected light waves 14 and 15 emerge with a phase ψ, as illustrated in FIG. 3. This results in light waves emerging from the data storage medium 1 in the manner of a diffraction grating in many directions, in which phase information is contained. At some distance from the data storage means 1, a detector can be used to register a holographic image, which is brought about by interference between these light waves and represents a reconstruction of the stored information.

Figure 4:
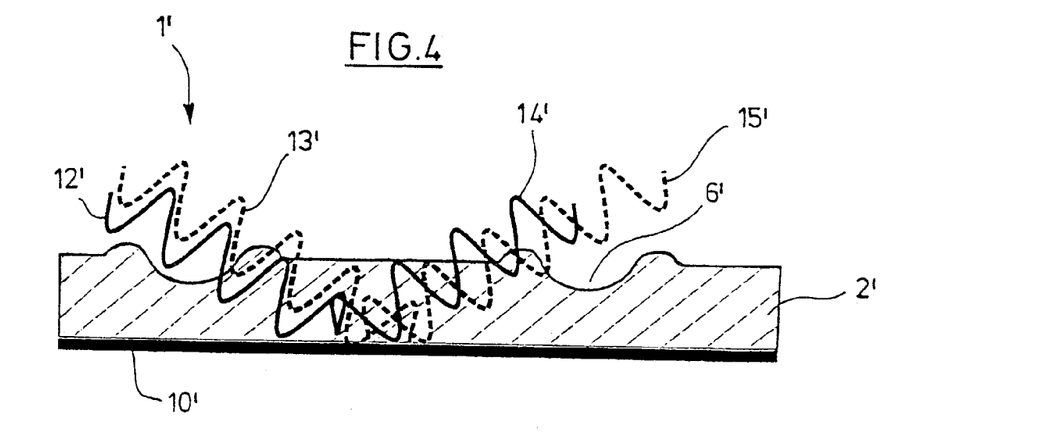
FIG. 4 shows a schematic view of a second embodiment of the holographic data storage medium according to the invention during the reading of information.

FIG. 4 shows a further embodiment of a data storage medium, which is designated 1' here and has a polymer film 2' configured in a similar way to the polymer film 2. As distinct from the embodiment according to FIGS. 1 to 3, however, the data storage medium 1' is provided from the start with a reflective layer 10' on the flat underside of the polymer film 2'. When information is put in, that is to say when the surface structure of the polymer film 2' is changed, the pits 6' indicated in FIG. 4 being produced, the reflective layer 10' is not affected.

In order to read information out of the data storage medium 1', coherent light can be used as before, as indicated in FIG. 4 by the incident light waves 12' and 13'. These light waves are reflected at the reflective layer 10' and emerge as reflected light waves 14' and 15'. Since the light waves, as they pass twice through the polymer film 2', are subject to relative phase shifts because of the varying surface structure of the pits 6', a holographic image can also be reconstructed from the surface structure of the data storage medium 1'.

The expenditure required for the detector and the further processing of the holographic image recorded depend on the type of stored object. For the reproduction of machine-readable data (data pages, see above), a CCD sensor connected to a data processing device is particularly suitable, while for pure image reproduction, a simpler detector is also practical, in particular if the image data are not to be processed further.

Further possibilities for a reflective layer have already been described further above. For example, in the arrangement according to FIG. 3, the incident light waves can also strike the reflective layer from above, so that the light does not pass through the polymer film 2. Furthermore, a reflective layer can be dispensed with, in particular if the incident light strikes it at a shallow angle. The additional possibilities for holographic data storage, which result when the local reflection capacity of a reflective layer can be changed by local heating, have already been explained.

In addition to the layers illustrated in the figures, the data storage means can have additional layers, for example a layer with absorber dye, a protective layer or a carrier layer. For example, in the embodiment according to FIG. 4, a carrier layer can be arranged underneath the reflective layer 10' and, in a preferred embodiment, is provided on its underside with an adhesive layer. With the aid of this adhesive layer, the data storage medium can be stuck directly to an object. In this way, the data storage means can be used as a type of label, which contains virtually invisible information which can be decoded only with the aid of a holographic construction for reading information.

We claim:

1. A holographic data storage medium, comprising a biaxially-oriented polymer film in which holographic information is stored via changes in the local surface structure thereof, a reflective layer arranged on the surface of the polymer film that is changed by the storage of the holographic information, and an adhesive layer for adhering the holographic data storage medium to an object, wherein the holographic data storage medium stores therein holographic information, relating to the object to which it is adhered, as local, point by point changes in the polymer orientation, and thus, the surface structure, of the storage layer by heating through a single laser beam serving as a write beam, wherein the surface structure changes are pits of predefined size, and wherein the polymer film comprises a material selected from the following group: polypropylene, polyethylene terephthalate, polymethyl pentene, polyvinyl chloride and polyimide.

2. The holographic data storage medium according to claim 1, wherein an absorber dye is assigned to the polymer film, which absorber dye is set up to at least partly absorb and to deliver the heat produced in the process at least partly locally to the polymer film.

3. The holographic data storage medium according to claim 2, wherein the absorber dye is contained in the material of the polymer film.

4. The holographic data storage medium according to claim 2, wherein the absorber dye is arranged in a separate absorber layer.

5. The holographic data storage medium according to claim 4, wherein the absorber dye comprises a binder.

6. A method of writing information into a holographic data storage medium according to claim 1, the method comprising:
calculating holographic information included in a hologram of a storing object as a two-dimensional array;
directing the write beam onto the storage layer of the holographic data storage medium; and
controlling the write beam in accordance with the two-dimensional array in such a way that, via local heating by the write beam, the local surface structure of the polymer film and the local reflectivity of the reflective layer are set in accordance with the holographic information.

7. The method according to claim 6, wherein the holographic information is stored in binary encoded form.

8. The method according to claim 6, wherein the holographic information is stored in continuously encoded form, the local maximum height change of the surface structure in a respective pit being selected from a predefined value range.

9. A method of reading information out of a holographic data storage medium according to claim 1, the method comprising:
directing light at a large area of the storage layer of the holographic data storage medium, which light is modulated by the surface structure of the polymer film, and detecting a holographic image at a distance from the data storage medium as a reconstruction of the holographic information contained in the area covered by the light.

10. The method according to claim 9, wherein the light shines through the polymer film.

11. The method according to claim 9, wherein the light does not shine through the polymer film.

12. The method according to claim 9, wherein the holographic image is detected by a CCD sensor connected to a data processing device.

13. The holographic data storage medium according to claim 1, wherein the predefined size of the pits is between about 0.5 micrometers and 1 micrometer.

14. A method of writing information into a holographic data storage medium comprising a biaxially-oriented polymer film whose surface structure can be changed locally by heating, a reflective layer arranged on the surface of the polymer film that is changed by the storage of the holographic information, and an adhesive layer for adhering the holographic data storage medium to an object, wherein the polymer film comprises a material selected from the following group: polypropylene, polyethylene terephthalate, polymethyl pentene, polyvinyl chloride, and polyimide, the method comprising:
calculating holographic information, relating to the object to which the holographic data storage medium is to be adhered, contained in a hologram of a storing object as a two-dimensional array;
directing a single write beam of a writing device onto the storage layer of the data storage medium; and
controlling the write beam in accordance with the two-dimensional array in such a way that the polymer orientation and, thus, the local surface structure of the polymer film is changed in accordance with the holographic information, wherein the changing of the local surface structure of the polymer film is induced by the write beam point by point in the form of pits of predefined size.

15. The method according to claim 14, wherein the predefined size of the pits is between about 0.5 micrometers and 1 micrometer.

16. A method of writing data to a holographic data storage medium comprising a biaxially-oriented polymer film in which holographic information is stored via changes in the local surface structure thereof, a reflective layer arranged on the surface of the polymer film that is changed by storage of the holographic information, and an adhesive layer for adhering the holographic data storage medium to an object, wherein the polymer film comprises a material selected from the following group: polypropylene, polyethylene terephthalate, polymethyl pentene, polyvinyl chloride, and polyimide, the method comprising:
using a single write beam to store holographic data, relating to the object on which the holographic data storage medium is to be adhered, in the holographic data storage medium by locally changing both the polymer orientation and thus, a surface structure, of the polymer film and an optical transmissivity of the reflecting layer, wherein the change of the surface structure is induced by the write beam point by point in the form of pits of predefined size,
whereby both phase modulation and amplitude modulation are provided to a read out beam for reading out the stored holographic data from the holographic data storage medium.

17. The method according to claim 16, wherein the predefined size of the pits is between about 0.5 micrometers and 1 micrometer.

18. A data storage medium encoded with holographic information, the data storage medium comprising a biaxially-oriented polymer film in which holographic information is stored via changes in the local surface structure thereof, wherein the polymer film comprises a material selected from the following group: polypropylene, polyethylene terephthalate, polymethyl pentene, polyvinyl chloride, and polyimide, a reflective layer arranged on the surface of the polymer film that is changed by the storage of the holographic information, and an adhesive layer for adhering the holographic data storage medium to an object, wherein the holographic information relates to the object to which the holographic data storage medium is to be adhered and is encoded as pits, formed in the polymer film by a single laser beam serving as a write beam, which produce a holographic image when irradiated with coherent light and wherein each pit corresponds to one of two different values for a difference in level between a high point and low point thereof so that the holographic information is binary-encoded.

19. The data storage medium according to claim 18, wherein the pits are arranged in a grid.

20. The data storage medium according to claim 19, wherein a distance between centers of two adjacent pits in the grid is between 1 and 2 micrometers.

21. The data storage medium according to claim 18, wherein the pits have linear lateral dimensions between about 0.5 and 1 micrometer.

22. The data storage medium according to claim 18, further comprising a reflecting layer provided on a surface of the polymer film in which the pits are binary-encoded.

23. The data storage medium according to claim 18, further comprising an adhesive layer.

24. A data storage medium encoded with holographic information, the data storage medium comprising a biaxially-oriented polymer film in which holographic information is stored via changes in the local surface structure thereof, wherein the polymer film comprises a material selected from the following group: polypropylene, polyethylene terephthalate, polymethyl pentene, polyvinyl chloride, and polyimide, a reflective layer arranged on the surface of the polymer film that is changed by the storage of the holographic information, and an adhesive layer for adhering the holographic data storage medium to an object, wherein the holographic information relates to the object to which the holographic data storage medium is to be adhered and is encoded as pits, formed in the polymer film by a single laser beam serving as a write beam, which produce a holographic image when irradiated with coherent light and wherein each pit corresponds to one of multiple values in a range of values for a difference in level between a high point and low point thereof so that multiple bits of holographic information are encoded in each pit.

* * * * *